(12) United States Patent
Steiner

(10) Patent No.: US 6,377,274 B1
(45) Date of Patent: *Apr. 23, 2002

(54) S-BUFFER ANTI-ALIASING METHOD

(75) Inventor: Walter R. Steiner, Enterprise, FL (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/354,189

(22) Filed: Jul. 15, 1999

(51) Int. Cl.[7] .............................................. G06T 11/40
(52) U.S. Cl. ........................ 345/611; 345/612; 345/614; 345/606; 345/581
(58) Field of Search ................................ 345/611, 612, 345/613, 614, 606, 589, 581

(56) References Cited

U.S. PATENT DOCUMENTS

| 4,714,428 A | * | 12/1987 | Bunker et al. ................. 434/43 |
| 4,727,365 A | | 2/1988 | Bunker |
| 4,825,391 A | | 4/1989 | Merz |
| 5,528,738 A | * | 6/1996 | Sfarti et al. ................... 395/143 |
| 5,555,360 A | * | 9/1996 | Kumazaki et al. ........... 395/143 |
| 5,668,940 A | * | 9/1997 | Steiner et al. ............... 345/429 |
| 5,684,939 A | * | 11/1997 | Foran et al. ................. 395/131 |
| 5,872,902 A | * | 2/1999 | Kuchkuda et al. ........... 395/130 |
| 6,005,580 A | * | 12/1999 | Donovan ..................... 345/428 |
| 6,057,855 A | * | 5/2000 | Barkans ....................... 345/435 |
| 6,226,005 B1 | * | 5/2001 | Laferriere .................... 345/426 |

* cited by examiner

*Primary Examiner*—Matthew Luu
*Assistant Examiner*—Daniel J Chung
(74) *Attorney, Agent, or Firm*—Scully, Scott, Murphy & Presser

(57) ABSTRACT

A method and apparatus, for use in a computer image generation system wherein polygons are displayed on an array of pixels, for encoding data representing intersections of the polygons and the pixels. The method comprises the steps of receiving input data signals characterizing a set of coordinates of each of at least three vertices of each polygon to be displayed, each different pair of the vertices of each polygon defining a different edge of the polygon; and generating, responsive to the received vertex data signals, edge data signals describing the intersection, if any, of the polygon edges with each pixel to be displayed.

12 Claims, 8 Drawing Sheets

| Top Crossing Flag | Bot Crossing Flag | Left Crossing Flag | Right Crossing Flag | Edge Crossing <4 bits> | Mesh Flag | Description |
| --- | --- | --- | --- | --- | --- | --- |
| 0 | 0 | 0 | 0 | 1 | x | No anti-aliasing |
| 0 | 0 | 0 | 0 | 0 | x | Conditionally no anti-aliasing |
| 0 | 0 | 0 | 0 | 2 | mesh | Anti-aliasing |
| 0 | 0 | 0 | 0 | 3 to 7 | mesh | Spare |
| 0 | 0 | 0 | 1 | Right xing | mesh | Right Crossing |
| 0 | 0 | 1 | 0 | Left xing | mesh | Left Crossing |
| 0 | 0 | 1 | 1 | Left  Right | mesh | 2 bits of left and right xing |
| 0 | 1 | 0 | 0 | Bottom xing | mesh | Bottom Crossing |
| 0 | 1 | 0 | 1 | Right  Bot | mesh | 2 bits of bot and right xing |
| 0 | 1 | 1 | 0 | Left  Bot | mesh | 2 bits of left and bot xing |
| 0 | 1 | 1 | 1 | (Right + left + bot)/3 | mesh | Average of crossings |
| 1 | 0 | 0 | 0 | Top xing | mesh | Top Crossing |
| 1 | 0 | 0 | 1 | Top  Right | mesh | 2 bits of top and right xing |
| 1 | 0 | 1 | 0 | Left  Top | mesh | 2 bits of left and top xing |
| 1 | 0 | 1 | 1 | (Left + top + right)/3 | mesh | Average of crossings |
| 1 | 1 | 0 | 0 | Top  Bot | mesh | 2 bits of top and bot xing |
| 1 | 1 | 0 | 1 | (Top + bot + right)/3 | mesh | Average of crossings |
| 1 | 1 | 1 | 0 | (Top + bot + left)/3 | mesh | Average of crossings |
| 1 | 1 | 1 | 1 | (Left+right+top+bot)/4 | mesh | Average of crossings |

Encoding Edge Crossings

Figure 5

S-BUFFER ANTI-ALIASING METHOD

FIELD OF THE INVENTION

This invention relates to computer image generation (CIG) systems, and, more particularly, to a novel color determination means for use in a display processor and to novel methods for processing image data describing object faces, for display of two-dimensional representations of those objects in a real-time imaging system.

BACKGROUND OF THE INVENTION

Real-time computer image systems are being designed to provide realistic image reproduction for a variety of video graphic systems, such as video games and video training and simulation devices. In these systems, it is very advantageous to provide the user with video display realism.

In a typical real-time computer image generation system, such as a video game, image generation is done in three sequential stages: Controller, Geometry Processor, and Display Processor. Each of these three processing stages or sections each work independently on data representating of or corresponding to one of three consecutive scenes to be displayed. Each of these processing stages or sections processes data on a scene or image for a fixed time, which may be either a field time of 16.67 milliseconds or a frame time of 33.3 milliseconds, usually the former. These particular field and frame times corresponds to those of a typical television format display, i.e., two interlaced fields per frame with thirty frames per second.

For each time interval, all three processors are kept busy so that, at any given time, the processors are working on three separate scenes. Each section processes inputs and generates outputs during the interval, so data flows through the three stages in a sequential manner from the controller, to the Geometry Processor, and then to the Display Processor. The computational load is spread out among the specialized processor sections, new scenes can be displayed each field or frame time, even though the results are delayed three field or frame times.

For example, in a video game that simulates a flight system, user, or player, inputs are received by the Controller; and after being processed sequentially by the Controller, the Geometry Processor and Display Processor, the output is sent as a color scene to video displays observed by the player. The data seen by the player starts out as simple control inputs applied to an environment definition and is converted to pixel video display information. In the controller, the player inputs are used to calculate the new position and orientation of the simulated aircraft, and from this, a mathematical rotation matrix is calculated that is used to rotate objects from a reference coordinate system to a display coordinate system. Other information dealing with the aircraft, with the position of targets and with other aircraft is also calculated in the Controller. In some applications, the Controller is a general purpose computer.

The Geometry Processor reads, from a database, descriptions of objects that are potentially visible in the stored three-dimensional digital representation of the scene, and the objects that are read are rotated into display coordinates using the rotation matrices calculated in the Controller. The Geometry Processor mathematically projects the three-dimensional data onto the two-dimensional display window. In addition, the Geometry Processor calculates (as by use of a depth-buffer or the like) which objects are in front or behind other objects and stores this information in a priority list.

Each object processed is comprised of individual faces, where each face is in the form of a polygon bounded by straight edges. The priority list contains the order of all faces in the scene, with the first face in the list as the highest priority face, and the last face in the list as the lowest priority face. Whenever two faces overlap on the display, the higher priority face will be visible, and the lower priority face will be obscured. Lastly, the Geometry Processor calculates the display end points for the edges that bound the two-dimensional faces, and also calculates the coefficients of the line equations that describe these bounding edges.

The Display Processor receives the two-dimensional face descriptions, along with additional face related data and uses this information to output data describing to a color display each pixel in the scene. Each color display in the system is typically made up of 1024 lines of video information, with each line having 1024 individual color dots or pixels. The Display Processor has to resolve, for each pixel, what the color of the pixel should be, given that many faces can be present in a pixel, and that certain portions of faces may be covered by other faces. Since values for all of these pixels need to be calculated in $\frac{1}{60}$th of a second, the processing load in the Display Processor is very high. To calculate video for a multi-display system (a single system has contained as many as 14 displays), the Display Processor must perform in excess of 10 billion computations per second.

One persistent problem has been to process pixel color intensity information in an anti-aliasing manner, which allows for suitable high-definition edge effects to be visible while preventing undesirable video data components ("distortion") from taking on the identity of a desired component, so as to appear as the wrong color, or degree of translucency, in that pixel.

SUMMARY OF THE INVENTION

An object of this invention is to provide an improved anti-aliasing procedure for computer image generation systems.

Another object of the present invention is to provide an improved process for encoding edge intersection data for use in an anti-aliasing procedure in a computer image generation system.

These and other objectives are attained with a method and apparatus, for use in a computer image generation system wherein polygons are displayed on an array of pixels, for encoding data representing intersections of the polygons and the pixels. The method comprises the steps of receiving input data signals characterizing a set of coordinates of each of at least three vertices of each polygon to be displayed, each different pair of the vertices of each polygon defining a different edge of the polygon; and generating, responsive to the received vertex data signals, edge data signals describing the intersection, if any, of the polygon edges with each pixel to be displayed.

The generating step includes, for each pixel to be displayed, i) identifying in a first field of one of the edge data signals, and for each side of the pixel, whether or not the edges of a selected one of the polygons intersect said side of the pixel, and ii) if the edges of the selected polygon intersects any side of the pixel, storing, in a second field of said one of the edge data signals, an estimate of the location along the side or sides of the pixel at which the polygon edges intersect the pixel side.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 5 shows a table that identifies the data bits of edge crossing signals;

DESCRIPTION OF AN ILLUSTRATIVE EMBODIMENT

Figure 1:
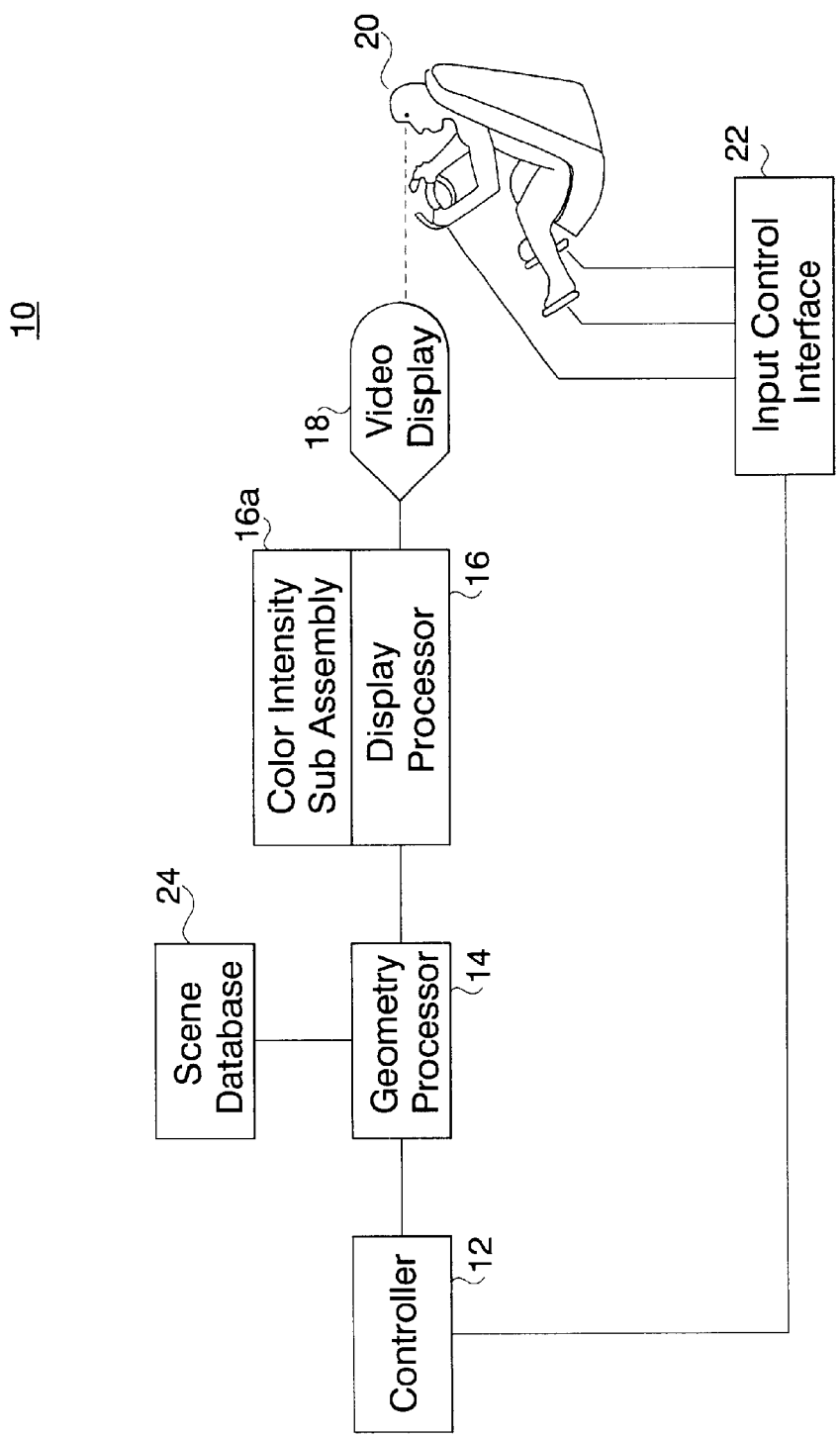
FIG. 1 is a schematic block diagram of a computer image generation (CIG) system in which the apparatus and methods of the present invention may be practiced.

Referring initially to FIG. 1, a functional block diagram of a computer image generation system 10, such as an aircraft cockpit simulation system, is illustrated. The reader is referred to the existing CIG art, including such publications as U.S. Pat. No. 4,727,365, issued Feb. 23, 1988 to Bunker et al., for "Advanced Video Object Generator"; U.S. Pat. No. 4,825,391, issued Apr. 25, 1989 to D. Merz, for "Depth Buffer Priority Processing For Real Time Computer Image Generating Systems"; and U.S. Pat. No. 5,668,940 issued to W. Steiner and M. Morgan, for "Method and Apparatus For Anti-Aliasing Polygon Edges In a Computer Imaging System." These three U.S. Pat. Nos. 4,727,365; 4,825,391 and 5,668,940 are incorporated herein in their entireties by reference.

The system 10 includes a Controller unit 12, a Geometry Processor unit 14, and a Display Processor unit 16. The Display Processor unit 16 displays information to a display window 18 to simulate the movement of the aircraft over a scene. An operator 20 is linked to the computer image generation system 10 through input control interface 22. The operator's maneuvering action is fed to input control interface 22. The input control interface converts the appropriate data such as aircraft position, aircraft roll, pitch, and yaw attitude, from the operator to the Controller 12.

In the Controller 12, the operator inputs are used to calculate a new position and orientation of the aircraft, and from this, a mathematical rotation matrix is calculated that is used to rotate objects from the reference coordinate system to a display coordinate system, which is well known in the art. Other information dealing with the scene, the position of targets, or other aircraft is calculated in the Controller. In some computer image generation systems, the Controller unit 12 is a general purpose computer.

The Controller unit 12 is updated periodically by the most recent aircraft orientation. This orientation includes the aircraft roll, pitch, yaw, and position from the operator via the input control interface 22, to the Controller 12. The Controller 12 works on a scene for a field or frame time and then passes data to the Geometry Processor 14.

The Geometry Processor 14 reads from a scene database memory 24, descriptions of objects such as towers, roads, rivers, hangars, etc., that are potentially visible in the stored three dimensional digital representation of the earth. The objects are read from the scene database and are rotated into display coordinates using the rotation matrix calculated in the Controller 12. The Geometry Processor 14 clips all edges which extend beyond the view window boundaries in object space, and the processor 14 mathematically projects the three-dimensional object data onto the two-dimensional display window.

Object faces which extend beyond display window boundaries are clipped in two-dimensional image space. The two dimensional objects include points, lines, closed convex polygons, or combinations thereof. Each closed convex polygon is known as a face. Thus, each object processed is made up of individual faces, where each face is bounded by straight edges. Once the faces are computed from the three-dimensional objects, in the Geometry Processor 14, the data is passed to the Display Processor 16. In addition, the Geometry Processor 14 calculates, in known manner, which faces are in front or behind other faces and stores this information in a priority list.

This priority list contains the order of all faces in the scene where the first face in the list is the highest priority face, and the last face in the list is the lowest priority face. Whenever two faces overlap on a display, the higher priority face will be visible and the overlapped portion of the lower priority face will be obscured. After calculating the priority list, the Geometry Processor 14 calculates the display endpoints of the line segments that bound the two dimensional faces and calculates the coefficients of the line equations that describe the bounding edges. The Geometry Processor 14 calculates the endpoints of each edge and the slope of each edge that describe a bounded face. These data are then passed on to the Display Processor 16.

FIG. 1, shows Display Processor 16 that is used to drive the video display 18. In some systems, a single Controller 12 and Geometry Processor 14 is used to drive more than one Display Processor. The Display Processor is responsible for processing information to be displayed on video display 18. One particular task done by the Display Processor is to resolve for each pixel in the video display 18 what the color of the pixel should be, given the many faces that can be present in a pixel, and those portions of faces that may be covered by other faces. To perform this function, the Display Processor 16 thus receives two-dimensional face descriptions from the Geometry Processor 14, along with the face color, and a face priority list, and uses this information to output the scene to color video display 18. Each color display in a system can be made up of 1,024 or more lines of video information, and on each line there typically are 1,204 individual color dots or pixels (picture elements). For each pixel the display may receive a 12 bit red data signal, a 12 bit green data signal, and a 12 bit blue data signal as part of intensity information that describes the color of the pixel.

Figure 2:
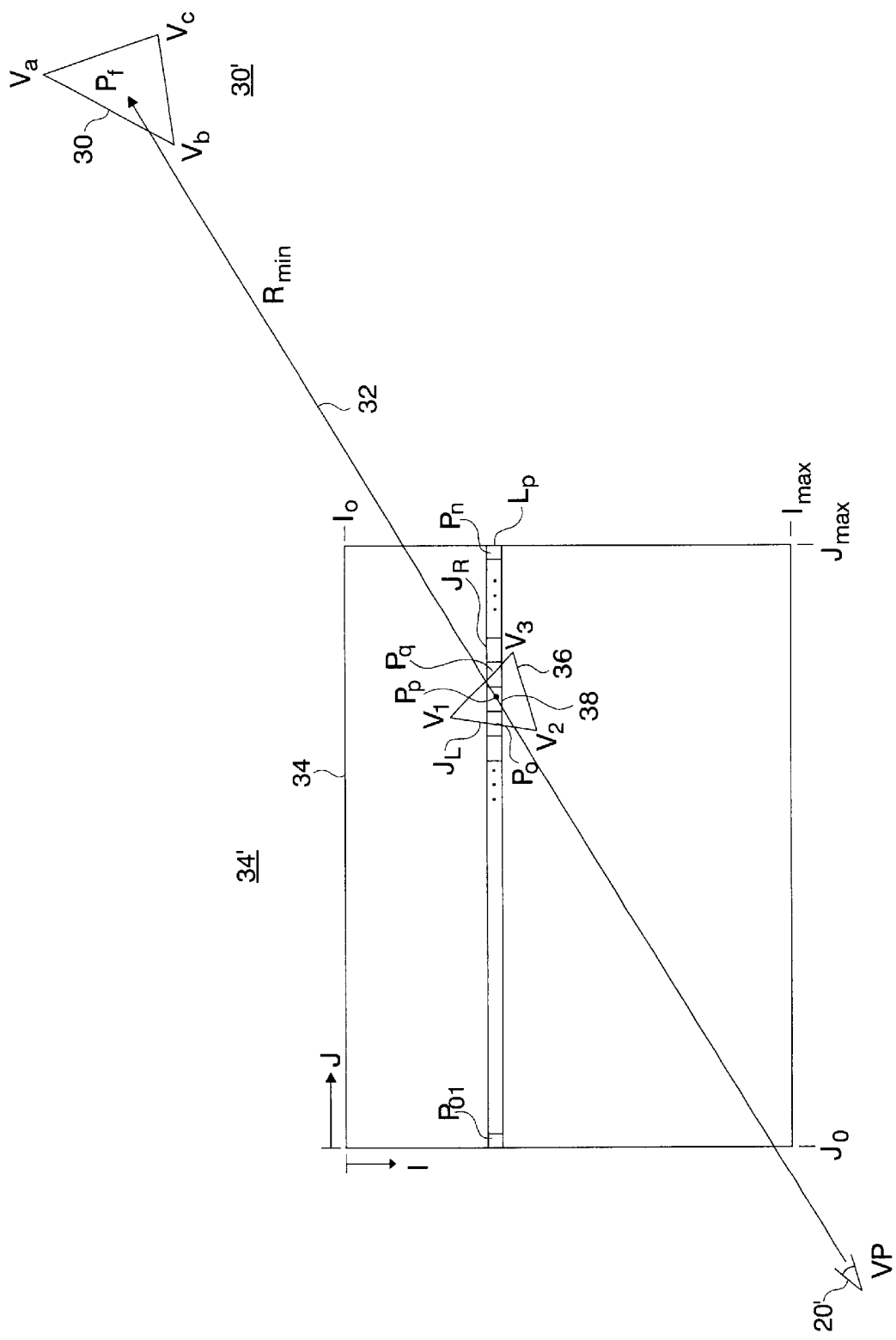
FIG. 2 is a spatial diagram illustrating the relationship between the object face polygon, in object space, and a corresponding image face polygon, in image space, and the picture elements (pixels) of the display raster upon which the image face will appear.

With reference to FIG. 2, the eyes 20' of the observer are at a viewpoint VP and look at a sample face polygon 30 within the view window in object space 30'. Only the face 30 closest to viewer 20', along a view line 32, is seen; and the visible face is determined by comparison of range distance R between view point VP and a face point Pf, using depth buffer techniques well known in the art (see, for example, the aforementioned U.S. Pat. No. 4,825,391 and the references cited therein). Thus, visible polygon 30 (here, a triangular face identified by its vertices Va, Vb and Vc) is that polygon having the minimum range $R_{min}$ along view line 32. The object space 30' is projected into a display window 34 in image space 34'; and face polygon 30 is projected as display polygon 36, with respective vertices V1, V2 and V3 corresponding to vertices Va, Vb and Vc, respectively.

The display window is often the raster of the display with each pixel 38 scanned in sequential fashion along a horizontal line (in the J direction) from the left edge ($J=J_o$) to the right edge ($J=J_{max}$) of the raster/window, and for lines with increasing distance (in the I direction) down from the raster/window top edge (where $I=I_o$) to the bottom edge ($I=I_{max}$) Thus, the path line Lp is scanned from a first (left-hand) pixel P1 to a last (right-hand) pixel Pr. A pixel Pp is identified by the view line 32 passing through the window plane 34, so that pixel line Lp includes an image point projecting, and corresponding, to polygon point Pf. The polygon 36 will, along with line Lp, include pixels from a leftmost pixel Po, identified by the $J_L$ crossing at the left line location, to a rightmost pixel Pq, identified by the $J_R$ crossing at the right line location.

Figure 2A:
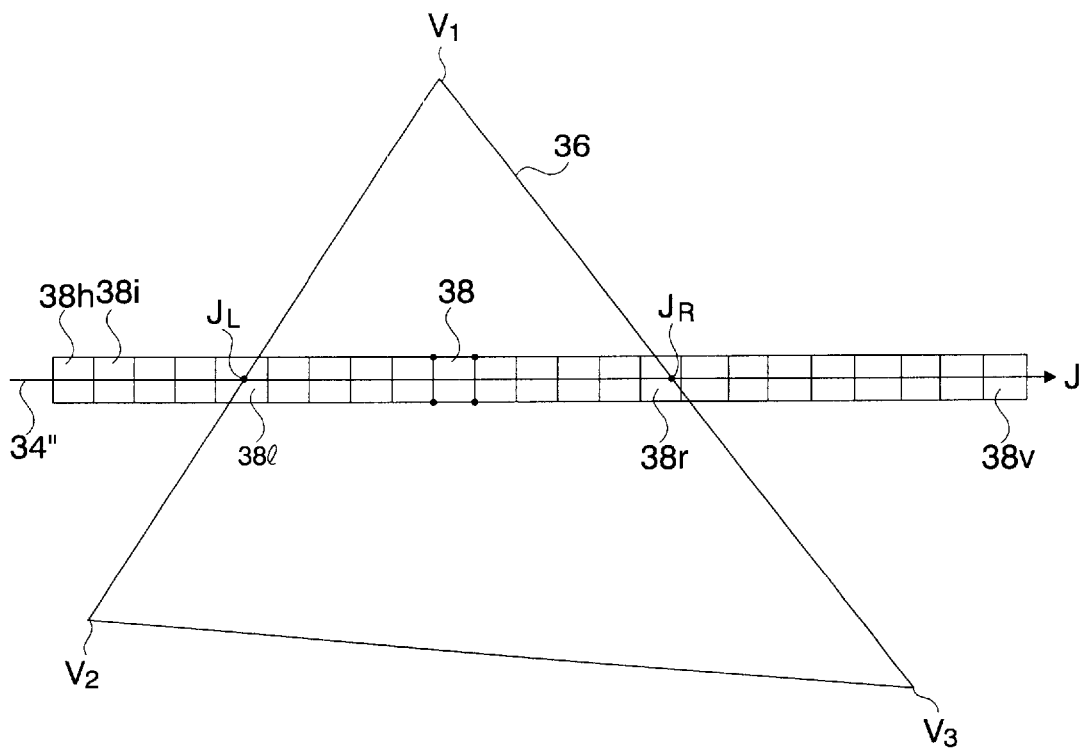
FIG. 2a is a magnified portion of the image display of FIG. 2 in the vicinity of the desired polygon to be displayed.

With reference to FIG. 2a, a row of the pixels 38 along the scan line 34" is sequentially scanned in the J direction, starting at leftmost pixel 38h. The next pixel 38i is then operated upon, and so forth, until a pixel 38l is reached on the left edge of the polygon for that line and partially covered by the polygon 36. This pixel is identified as a leftmost crossing $J_L$ of a polygon edge and the J line 34". Continuing along this line, through other pixels 38 completely covered by the polygon, a pixel 38r is reached on the right edge of the polygon and partially covered by the polygon 36. This pixel is identified as a rightmost crossing $J_R$ of a polygon edge. Further travel along the J line 34" eventually reaches the rightmost pixel 38v of that scan line.

It will be seen that, without consideration of translucency and feedthrough of chroma from a more-distant polygon, the attributes of the pixels 38 that are completely covered by, and therefore totally within, the polygon 36 have exactly the polygon face attributes (color, intensity, translucency, etc.). In contrast, the pixels (e.g. pixels 38l and 38r) that are partially covered by the polygon 36 have the attributes of that particular polygon only for the pixel portion actually covered, so that the attributes for the remainder of the pixel must be obtained from other information and blended according to the various percentages of the pixel covered by each polygon/source of color information.

Figure 3A:
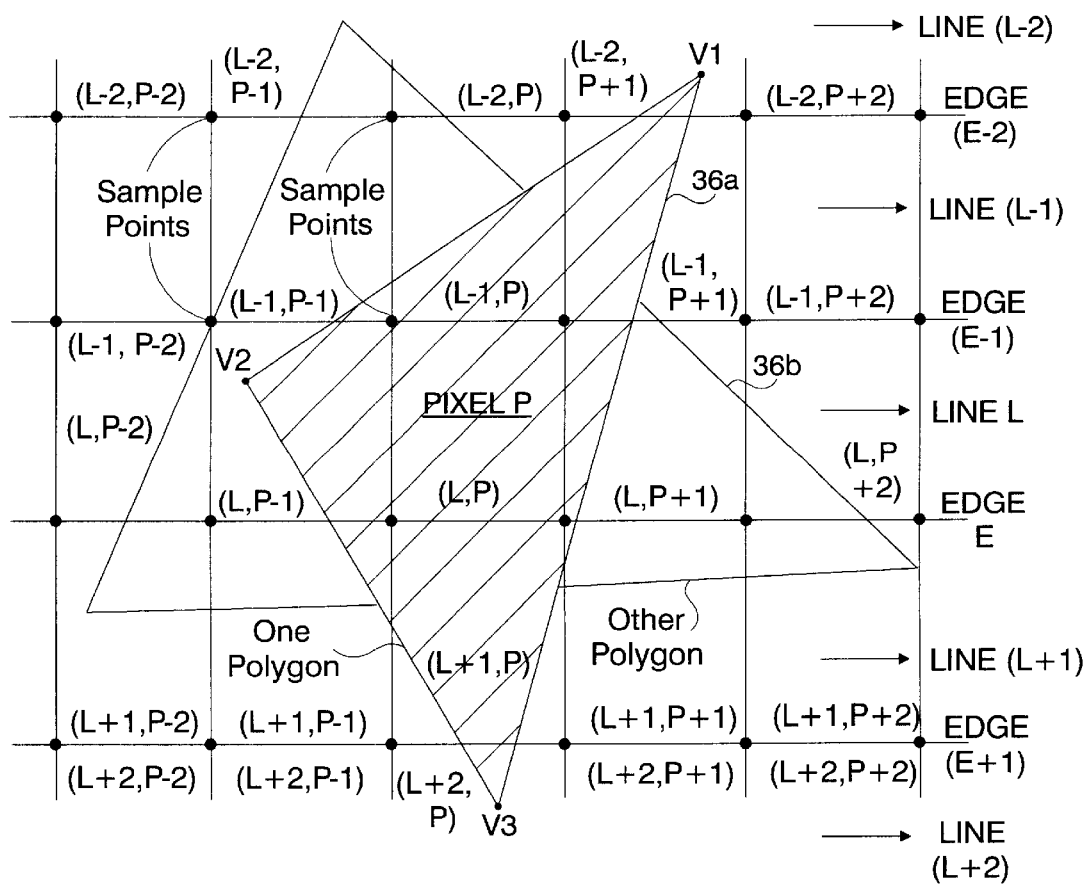
FIG. 3a is a view of an array of display pixels, upon which a pair of face polygons are imaged.
Figure 3B:
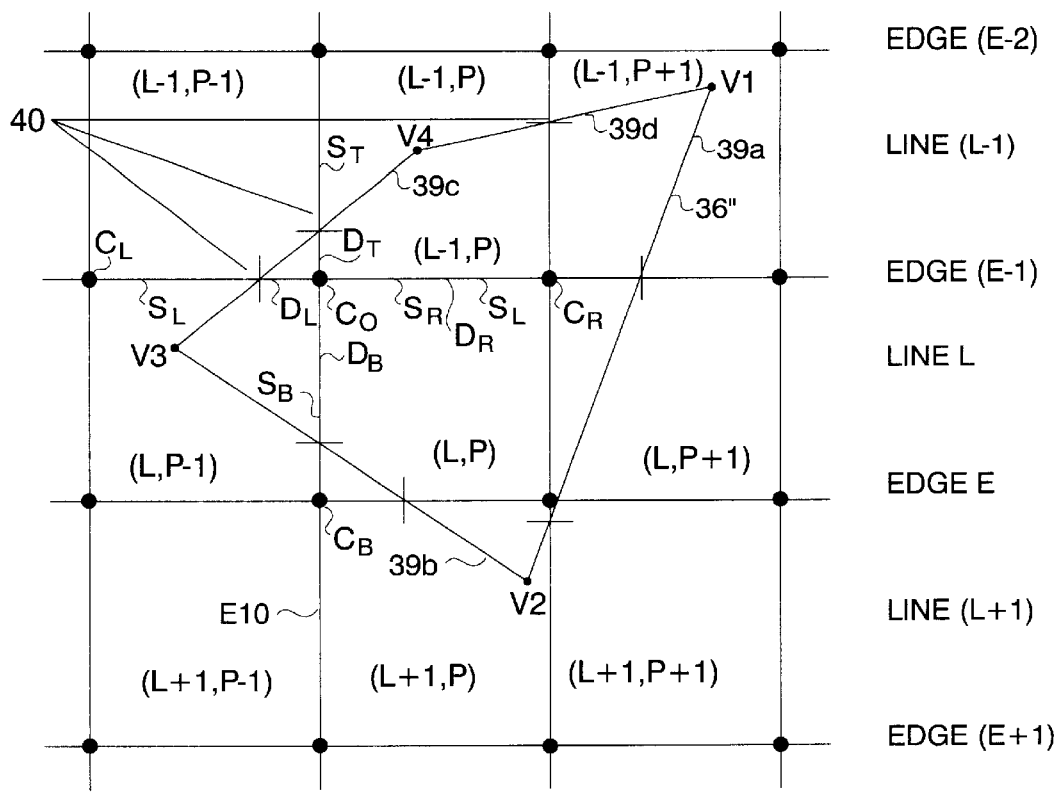
FIG. 3b is a view of an array of display pixels, upon which a face polygon is positioned, and shows various pixel edges E and edge distances D that may be used to determine pixel color data.

This may be understood by reference to FIG. 3a, wherein a first polygon 36a is ordered (as by any of the well-known depth-buffering processes) in front of another polygon 36b, as seen in image space. Polygon 36" has a plurality of vertices (e.g. four vertices V1, V2, V3 and V4 in FIG. 3b) connected by a like plurality of polygon edges 39 (e.g. as shown in FIG. 3b, edges 39a, 39b, 39c and 39d) which cross pixel boundaries at crossings 40. The image screen is formed of a rectangular array of pixels, arranged in vertical columns (e.g. columns . . . , P−2, P−1, P, P+1, P+2 . . . ) sequentially along horizontal lines (e.g. lines . . . , L−2, L−1, L, L+1, L+2, . . . ) with horizontal edges E at the lower demarcation of each line L of pixels with the next-higher-numbered (next-to-be-scanned) pixel line. Each pixel can thus be ordered by its rowline L and column P designation. It will be seen that some pixels, such as pixel (L,P), will be completely covered by only one polygon (polygon 36a) and thus have only the attributes of that polygon, while other pixels have a sharing/blending of the attributes of plural polygons.

With reference to FIG. 3b, color attributes may be determined by consideration of the entire pixel and do not need to process color information for a plurality of subportions of each pixel (or subpixels), even if the depth-buffering processing architecture (with or without use of span/subspan processing methodology) of the aforementioned U.S. Pat. No. 4,825,391 is used. It should be understood that each item of information processed is a signal word of electronic digital data. While we may discuss these signals by shorthand designations (e.g. corners, edges, polygons, etc.), we nevertheless mean these terms to signify the data signals used for each of these respective geometrical concepts For instance, "corner" signifies the data word specifying the two-dimensional pixel corner location, "edge" is the data signal set representing the line of the associated polygon edge, "polygon" means the digital data structure equivalent of a particular polygon, etc. The end result of the process is to provide a final sequence of video signals (digital video, or analog video derived from digital) which can cause the color and intensity of the individual pixels of the video display means 18 to be illuminated and rendered visible to observer 20.

The extent to which a polygon, that partially covers a pixel, contributes to the final pixel attriubutes is determined on the basis of the intersection or intersections between the edges of the polygon and the pixel boundaries. One procedure for determining the pixel attributes in this way is described in detail in the above-identified U.S. Pat. No. 5,668,940.

Generally, in accordance with this procedure, input data signals are provided characterizing the display space coordinates of each of at least three vertices of each face polygon to be displayed. Then, this vertex data is utilized to determine which polygon edges, if any, cut one of the sequence of pixels forming the display raster, and then the location of the cut along the associated pixel edge is determined. The edge crossing data signals for all polygons affecting each pixel are stored on a per-pixel basis in a frame buffer, along with color data for each of the polygons occupying any portion of that pixel. For each pixel to be displayed, a constellation of several edges of selected adjacent pixels are processed for resolving edge relationships and mixing polygon color intensity data to determine the final, observable color of each display pixel.

Figure 4:
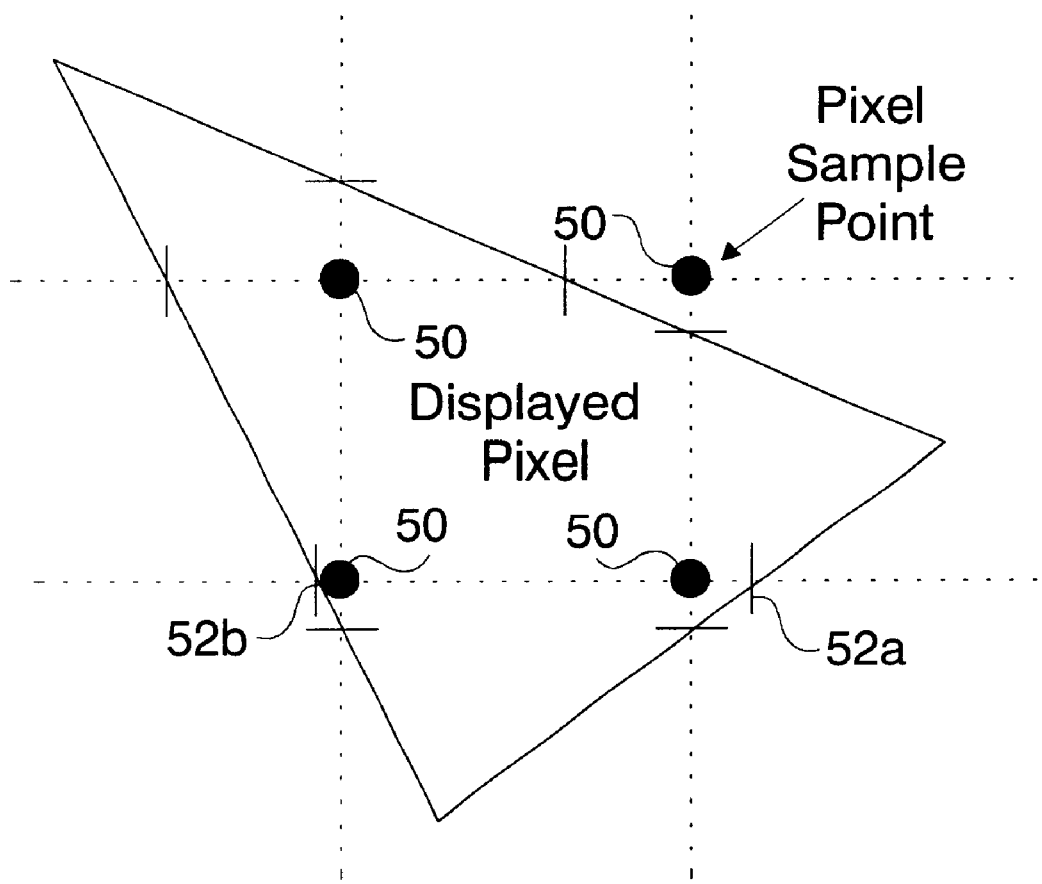
FIG. 4 illustrates a polygon that intersects several pixel boundaries.

With reference to FIG. 4, each pixel 50 is a sample point that samples the polygon. The location where the polygon edge crosses between adjacent pixel sample points is computed. For each pixel sample point, a top, left, right, and bottom edge crossing is computed. If the edge crossing is beyond the next pixel sample point, the edge crossing is flagged as covered which means that the polygon covers, or lies on, the adjacent pixel sample point. For example in FIG. 4, the right crossing 52a for the lower left pixel sample point, and the left crossing 52b for the lower right pixel sample point would be flagged as covered.

Each polygon edge can be flagged as anti-aliased, or not anti-aliased. Also, each polygon edge can be flagged as mesh anti-aliased. In this mode, the polygon edge is anti-aliased if mesh anti-aliasing is enabled for every polygon edge crossing of the pixel sample point, and the edge is not shared with another polygon, and the edge is flagged as anti-aliased. If mesh anti-aliasing is disabled, the edge is anti-aliased unless the edge is flagged as not anti-aliased.

If the pixel is part of an image rather than a polygon, the pixel is flagged as conditionally anti-aliased. In this case, if a polygon edge lies on the image, the polygon edge is anti-aliased with the image; otherwise, the image is not anti-aliased.

When using alpha buffer operations (source and destination blend modes) that blend the color in the frame buffer (destination) with the color that is being put in the frame buffer (source), the edge crossings are combined as follows:

The alpha buffer blend equation is: blend factor$_s$*source pixel+blend factor$_d$*destination pixel. If the blend factor$_s$ is zero, the source pixel has no edge crossings. If the blend factor$_d$ is zero, the destination pixel has no edge crossings. If the source pixel and the destination pixel do not have edge crossings, nothing is done. If the source pixel has edge crossings, and the destination pixel does not, the source pixel edge crossings are used. If the source pixel does not have edge crossings, and the destination pixel does, the destination pixel edge crossings are used. If the source pixel has edge crossings, and the destination pixel does as well, the source and destination pixel edge crossings are averaged.

The edge crossing can be compressed to 8 or 9 bits to fit into the frame buffer as indicated in the Table of FIG. 5.

The crossing flags, if set, indicate that there is an edge crossing, and if not set, indicate that the polygon lies on the adjacent pixels.

If mesh anti-aliasing is desired, nine bits are needed, otherwise, eight bits are needed. The mesh flag can replace the LSB of the blue color in the frame buffer. This will have the least impact on the image. The divide by 3 can be approximated. The edge crossings may be stored in the frame buffer in the alpha component. This restricts any blend mode that uses destination alpha.

The edge crossing data is read from the frame buffer during output time. The encoded edge crossing data can then be decoded back into the original edge crossing data.

Figure 6:
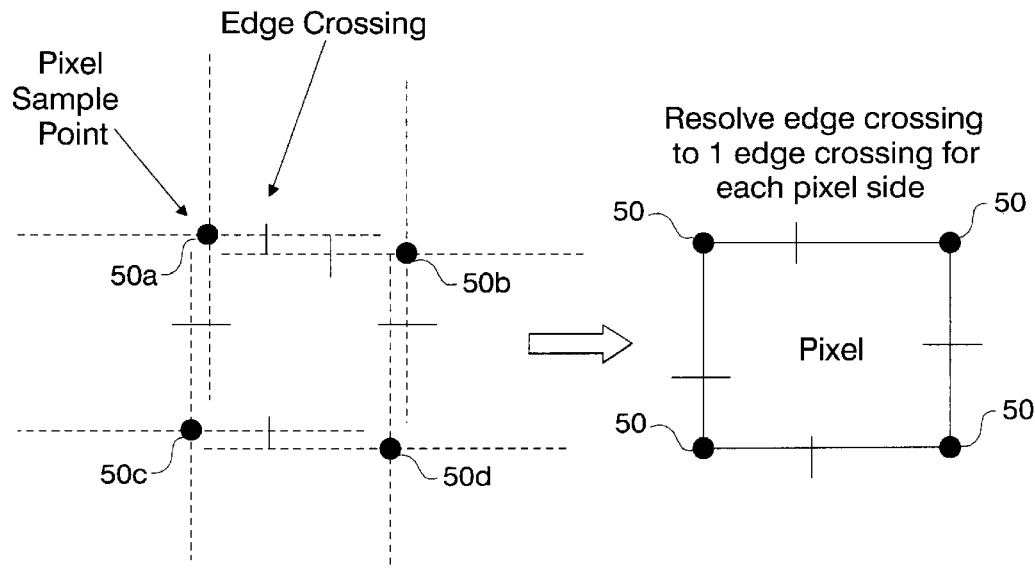
FIG. 6 illustrates a procedure for resolving edge crossings.

With reference to FIG. 6, four adjacent pixel sample points 50a, 50b, 50c and 50d are fetched from the frame buffer. These pixel sample points become the four corners of a pixel. Each sample point has four edge crossings and several flags. The edge crossings from each of the pixel sample points are resolved to form a single edge crossing for each side of the pixel. For example, the top left pixel sample point 50a has a right crossing, and the top right pixel sample point 50b has a left crossing. These two crossing are resolved to form one edge crossing for the topside of the pixel.

The rules for edge resolution are as follows:

If for any pixel sample point, the mesh flag is not set, then select no mesh anti-aliasing.

For each side of the pixel, select the two sample points.
i) If there is one edge crossing, then set the valid edge crossing flag to zero, and set the edge crossing flag to a default value (0.5).
ii) If there is one edge crossing from sample point A, and no edge crossing from the other sample point, then set the valid edge crossing flag to one, and set edge crossing equal to the edge crossing of sample point A.
iii) If there are two edge crossings and no mesh anti-aliasing, then set the valid edge crossing flag to one, and the edge crossing is the average of the 2 edge crossings.
iv) If there are two edge crossings and mesh anti-aliasing, then set the valid edge crossing flag to zero, and set the edge crossing flag to the default value (0.5).

If the pixel is to be anti-aliased, the pixel corner colors must be blended together as follows:

Note that edge crossings are scaled between 0 and 1.0 and increase numerically from left to right and from top to bottom.
i) If the upper left pixel sample point is flagged as no anti-aliasing, or if all of the pixel sample points are flagged as conditionally anti-aliased, or if there are no valid edge crossings and the mesh anti-aliasing flag is set, then the pixel color is the color of the upper left pixel sample point.
ii) If there are 2 valid edge crossings in the pixel, then compute area according to the following rules:

If(top crossing valid and bottom crossing valid), then
    Area_tl+=Area_bl=(top xing+bot xing)/4
    Area_tr=Area_br=½−Area_tl
If(right crossing valid and left crossing valid), then
    Area_tl=Area_tr=(right xing+left_xing)4
    Area_bl=Area_br=½−Area_tl
If(top crossing valid and left crossing valid), then
    Area_tl=(top xing*left_xing)/2
    Area_bl=Area tr=Area_br=(1−Area_tl)/3
If(top crossing valid and right crossing valid), then
    Area_tr=((1−top xing)*right xing)/2
    Area_bl=Area_tl=Area_br=(1−Area_tr)/3
If (bot crossing valid and left crossing valid), then
    Area_bl=(bot xing*(1−left xing))/2
    Area_br=Area_tr=Area_tl=(1−Area_bl)/3
If(bot crossing valid and right crossing valid), then
    Area_br=(bot xing*(1−right xing))/2
    Area_bl=Area_tr=Area_tl=(1−Area_br)/3
Else
    Area_tl=(top xing+left xing)/4
    Area_tr=(1−top xing+right xing)/4
    Area_bl=(1−bot xing+left xing)/4
    Area_br=(2−bot xing−right xing)/4

The final blended pixel color is determined by the equation:

Color=top left pixel corner color*Area_*tl*+top right pixel corner color*Area_*tr*+bot left pixel corner color*Area_*bl*+bot right pixel corner color*Area_*br*

Figure 7:
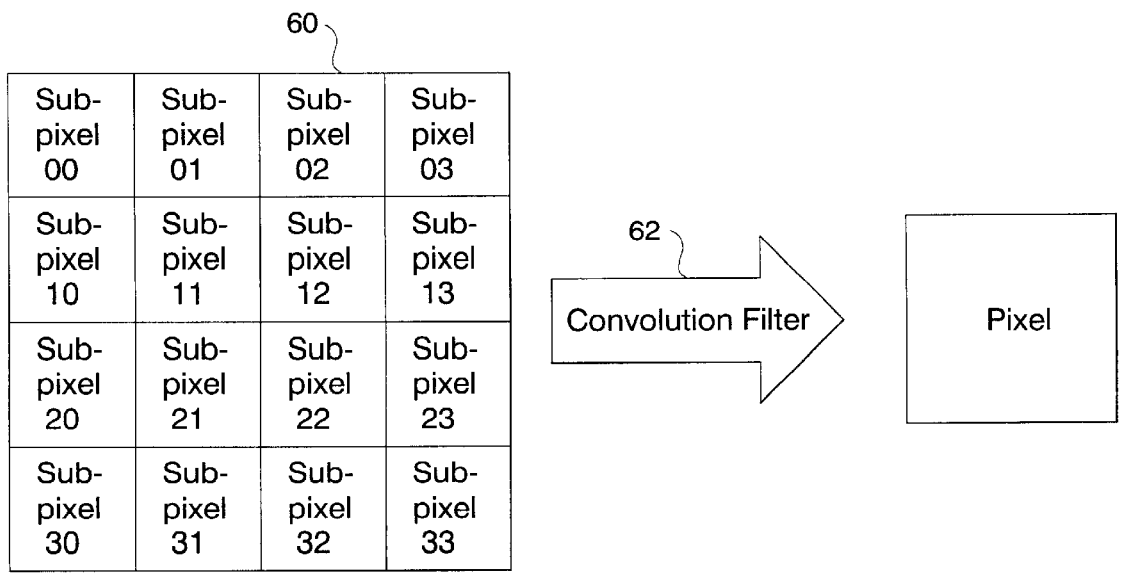
FIG. 7 schematically depicts a subpixel filter.

With reference to FIG. 7, if 2×2 S buffered subpixels per pixel 60 are desired for better sampling, the pixel resolution can be increased by a factor of 4, and then a post filter 62 applied to filter the pixels down to the display resolution.

Subpixel 11, 12, 21, and 22 are the subpixels that lie on the pixel to be displayed. The surrounding twelve subpixels are fetched, then a convolution filter is used to compute the pixel color according to the equation:

$$\text{pixel color} = W\left(\frac{\text{subpixel 11} + \text{subpixel 12} + \text{subpixel 21} + \text{subpixel 22}}{4}\right) + (1-W)\left(\frac{\text{all other subpixels}}{12}\right)$$

If the weight W is 1.0, then no surrounding subpixels are used. If W is 0.75, then a pyramid shaped filter is produced. If W is 0.5, then a uniform filter is produced.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

What is claimed is:

1. A method, for use in a computer image generation system wherein polygons are displayed on an array of pixels, for encoding data representing intersections of the polygons and the pixels, the method comprising:

receiving input data signals characterizing a set of coordinates of each of at least three vertices of each polygon to be displayed, each different pair of the vertices of each polygon defining a different edge of the polygon;

generating, responsive to the received vertex data signals, edge data signals describing the intersection, if any, of the polygon edges with each pixel to be displayed, and wherein the generating step includes for each pixel to be displayed
  i) for each side of the pixel, setting a respective one flag in a first field of one of the edge data signals either to a first value or to a second value to represent whether the edges of a selected one of the polygons intersect or do not intersect, respectively, said side of the pixel, and
  ii) if the edges of the selected polygon intersect any side of the pixel, encoding, in a predetermined-size second field of said one of the edge data signals, edge data representing an estimate of the location along the side or sides of the pixel at which the polygon edges intersect the pixel side or sides, the encoded edge data utilizing less storage space than un-encoded edge data, thereby reducing storage requirements necessary for representing intersections of the polygons and the pixels.

2. A method according to claim 1, wherein, the storing step includes the step of if the edges of the selected polygon intersect two sides of the pixel, then
  i) storing in a first subfield of the second field an estimate of the distance along a first of said two sides of the pixel at which the polygon edges intersect said first side, and
  ii) storing in a second subfield of the second field an estimate of the distance along a second of said two sides of the pixel at which the polygon edges intersect said second side.

3. A method according to claim 2, wherein:
the second field consists of a predetermined number of bit locations;
the first subfield consists of one half of said predetermined number of bit locations; and
the second subfield also consists of one half of said predetermined number of bit locations.

4. A method according to claim 2, wherein:
the second field consists of four bit locations;
the first subfield consists of a first and a second of said four bit locations; and
the second subfield consists of a third and a fourth of said four bit locations.

5. A method according to claim 1, wherein the storing step includes the step of:
if the edges of the selected polygon intersect three sides of the pixel, then
storing in the second field an average of the distances along said three sides of the pixel at which the polygon edges intersect said three sides.

6. A method according to claim 1, wherein the storing step includes the step of:
if the edges of the selected polygon intersect four sides of the pixel, then storing in the second field an average of the distances along said four sides of the pixel at which the polygon edges intersect said four sides.

7. An apparatus, for use in a computer image generation system wherein polygons are displayed on an array of pixels, for encoding data representing intersections of the polygons and the pixels, the apparatus comprising:

means for receiving input data signals characterizing a set of coordinates of each of at least three vertices of each polygon to be displayed, each different pair of the vertices of each polygon defining a different edge of the polygon;

means for generating, responsive to the received vertex data signals, edge data signals describing the intersection, if any, of the polygon edges with each pixel to be displayed, and wherein the generating means includes
  i) means to set, for each pixel to be displayed, in a first field of one of the edge data signals, and for each side of the pixel, a respective one flag either to a first value or to a second value to represent whether the edges of a selected one of the polygons intersect or do not intersect, respectively, said side of the pixel, and
  ii) means to encode in a predetermined-size second field of said one of the edge data signals, and if the edges of the selected polygon intersect any side of the pixel, edge data representing an estimate of the location along the side or sides of the pixel at which the polygon edges intersect the pixel side or sides, the encoded edge data utilizing less storage space than un-encoded edge data, thereby reducing storage requirements necessary for representing intersections of the polygons and the pixels.

8. An apparatus according to claim 7, wherein the means to store includes means to store in first and second subfields of the second field, and if the edges of the selected polygon intersect two sides of the pixel, estimates of the distances along, respectively, a first and a second of said two sides of the pixel at which the polygon edges intersect said first and second sides.

9. An apparatus according to claim 8, wherein:
the second field consists of a predetermined number of bit locations;
the first subfield consists of one half of said predetermined number of bit locations; and
the second subfield also consists of one half of said predetermined number of bit locations.

10. An apparatus according to claim 7, wherein:
the second field consists of four bit locations;
the first subfield consists of a first and a second of said four bit locations; and
the second subfield consists of a third and a fourth of said four bit locations.

11. An apparatus according to claim 7, wherein the storing means includes means to store in the second field, and if the edges of the selected polygon intersect three sides of the pixel, an average of the distances along said three sides of the pixel at which the polygon edges intersect said three sides.

12. An apparatus according to claim 7, wherein the storing means includes means to store in the second field, and if the edges of the selected polygon intersect four sides of the pixel, an average of the distances along said four sides of the pixel at which the polygon edges intersect said four sides.

* * * * *